US010087988B2

(12) United States Patent
Umekida (10) Patent No.: US 10,087,988 B2
(45) Date of Patent: Oct. 2, 2018

(54) WHEEL BEARING APPARATUS (71) Applicant: NTN CORPORATION, Osaka (JP)

(72) Inventor: Mitsuru Umekida, Shizuoka (JP)

(73) Assignee: NTN CORPORATION, Osaka (JP)

( * ) Notice: Subject to any disclaimer, the term of this patent is extended or adjusted under 35 U.S.C. 154(b) by 18 days.

(21) Appl. No.: 15/312,390

(22) PCT Filed: May 11, 2015

(86) PCT No.: PCT/JP2015/063436
§ 371 (c)(1),
(2) Date: Nov. 18, 2016

(87) PCT Pub. No.: WO2015/182357
PCT Pub. Date: Dec. 3, 2015

(65) Prior Publication Data
US 2017/0097045 A1 Apr. 6, 2017

(30) Foreign Application Priority Data

May 26, 2014 (JP) .................................. 2014-108109

(51) Int. Cl.
F16C 33/58 (2006.01)
F16C 19/18 (2006.01)
B60B 35/18 (2006.01)

(52) U.S. Cl.
CPC ............ F16C 33/585 (2013.01); B60B 35/18 (2013.01); F16C 19/186 (2013.01); F16C 2326/02 (2013.01)

(58) Field of Classification Search
CPC ..... F16C 33/585; F16C 2326/02; B60B 35/18
See application file for complete search history.

(56) References Cited

U.S. PATENT DOCUMENTS 5,501,530 A * 3/1996 Nagai ................ B60B 27/0005
384/516
7,648,283 B2 * 1/2010 Komori .................... B60B 3/02
384/506

(Continued)

FOREIGN PATENT DOCUMENTS

EP 2 573 412 3/2013
JP 2007-85555 4/2007

(Continued)

OTHER PUBLICATIONS

Machine Translation of JP 2009-191909.*

(Continued)

Primary Examiner — Thomas R Hannon
(74) Attorney, Agent, or Firm — Wenderoth, Lind & Ponack, L.L.P.

(57) ABSTRACT

A wheel bearing apparatus for rotatably supporting a wheel includes an inner member having two rows of raceway grooves on its outer circumference, an outer member having two rows of raceway grooves on its inner circumference, and rolling elements interposed between the raceway grooves of the inner and outer members. The raceway grooves of the inner and outer members are formed by hardened steel cutting. In relation to at least the raceway groove on the outboard side out of the raceway grooves of the inner member, h/d exceeds 0.50 where h is the depth of the groove and d is the diameter of the rolling elements. This provides a wheel bearing apparatus being compact and capable of withstanding a high applied load without inviting an increase in the size of the bearing.

17 Claims, 3 Drawing Sheets

10 Inner member
16a Raceway groove of inner member (on the inboard side)
16b Raceway groove of inner member (on the outboard side)
30 Outer member
36a Raceway groove of outer member (on the inboard side)
36b Raceway groove of outer member (on the outboard side)

(56) References Cited

U.S. PATENT DOCUMENTS

| | | | |
|---|---|---|---|
| 8,840,313 B2* | 9/2014 | Komori | B60B 27/0005 |
| | | | 384/544 |
| 2011/0235958 A1 | 9/2011 | Norimatsu | |
| 2012/0148181 A1* | 6/2012 | Aritake | B24B 19/06 |
| | | | 384/512 |
| 2013/0077909 A1 | 3/2013 | Komori | |
| 2016/0001597 A1* | 1/2016 | Komori | B60B 35/02 |
| | | | 384/544 |

FOREIGN PATENT DOCUMENTS

| | | | |
|---|---|---|---|
| JP | 2009-191909 | | 8/2009 |
| JP | 2011-241938 | | 12/2011 |
| JP | 2013076424 A | * | 4/2013 |
| WO | 2013/035756 | | 3/2013 |

OTHER PUBLICATIONS

Machine Translation of JP 2013-076424.*
International Search Report dated Aug. 4, 2015 in International (PCT) Application No. PCT/JP2015/063436.
English translation of International Preliminary Report on Patentability and Written Opinion of the International Searching Authority dated Nov. 29, 2016 in International (PCT) Application No. PCT/JP2015/063436.
Extended European Search Report dated Feb. 2, 2018 in corresponding European Patent Application No. 15799506.9.

* cited by examiner

Fig. 1

10 Inner member
16a Raceway groove of inner member (on the inboard side)
16b Raceway groove of inner member (on the outboard side)
30 Outer member
36a Raceway groove of outer member (on the inboard side)
36b Raceway groove of outer member (on the outboard side)

WHEEL BEARING APPARATUS

TECHNICAL FIELD

The present invention relates to a wheel bearing apparatus.

BACKGROUND ART

A wheel bearing apparatus, which is also referred to as a hub bearing, is for supporting a wheel of an automobile. There are a bearing apparatus for a driving wheel and a bearing apparatus for a driven wheel.

A wheel bearing apparatus has an inner member and an outer member which are relatively rotatable via rolling elements. One of the inner member and the outer member is fixed to a vehicle body, and the other is attached to a wheel. Accordingly, the member fixed to the vehicle body is the fixed side, and the member attached to the wheel is the rotating side. A wheel bearing apparatus having its inner member attached to the wheel and having its outer member attached to the vehicle body is referred to as an inner ring rotation type. A wheel bearing apparatus having its inner member fixed to the vehicle body and having its outer member attached to the wheel is referred to as an outer ring rotation type. In both of the types, the member attached to the wheel has a hub flange. Using hub bolts implanted into the hub flange and hub nuts, the wheel are fixed to the flange.

The wheel bearing apparatus for a driving wheel is the inner ring rotation type because it must transmit power to the driving wheel. That is, the inner member having the hub flange for attaching the wheel is rotatably supported by the outer member fixed to a knuckle, and the inner member is coupled to a drive shaft.

The wheel bearing apparatus for a driven wheel may be any of the inner ring rotation type and the outer ring rotation type. When it is the inner ring rotation type, the inner member is provided with the hub flange, and the inner member is rotatably supported by the outer member fixed to the vehicle body. When it is the outer ring rotation type, the outer member is provided with the hub flange, and the outer member is rotatably supported by the inner member fixed to the vehicle body.

A double row angular contact ball bearing with low torque characteristics is popularly employed as the wheel bearing apparatus for its desirable bearing rigidity, durability withstanding misalignment, and improved fuel efficiency. In a double row angular contact ball bearing, balls in a plurality of rows are interposed between a bearing inner ring (inner race) and a bearing outer ring (outer race). The rings are in contact with the rows of balls at a predetermined contact angle. The inner member corresponding to the bearing inner ring has two rows of raceway grooves along its outer circumference, and the outer member corresponding to the bearing outer ring has two rows of raceway grooves along its inner circumference. Between the opposing paired raceway grooves, a plurality of balls roll. The rows of rolling elements are retained at a predetermined interval in the circumferential direction by retainers.

In some cases, while the depth of a raceway groove, that is, the groove depth, is also referred to as a shoulder height, they are not exactly synonymous with each other. That is, the shoulder height is the distance from the bottom of a raceway groove to the upper surface of the shoulder (which is the outer diameter surface in relation to the inner member, and the inner diameter surface in relation to the outer member). On the other hand, the groove depth is the value obtained by subtracting, from the shoulder height, any chamfer, bevel, or auxiliary raceway surface provided at the surface of the raceway groove, that is, at the edge of the raceway surface. Accordingly, normally, the groove depth assumes a value smaller than the shoulder height. Here, the auxiliary raceway surface is a pseudo-raceway surface provided at the edge of the raceway surface so as to address an excessive load capacity. The cross-sectional shape of the raceway groove is an arc-shape. While the auxiliary raceway surface is continuous from the arc of the raceway groove, the auxiliary raceway surface is not formed by an extension of the arc of the identical curvature.

Patent Literature 1 discloses, in paragraph 0006, an auxiliary raceway surface that smoothly continues from an arc-shaped curved line forming the cross section of a raceway groove. Provision of such an auxiliary raceway surface is expected to exhibit the following effects. That is, when a great moment load is put on the bearing and the contact angle increases, the contact ellipse is pushed out from the raceway groove to the auxiliary raceway surface. However, since the auxiliary raceway surface smoothly continues from the arc-shaped curved line that forms the raceway groove, generation of the edge load is not invited despite the contact ellipse being pushed out to the auxiliary raceway surface. Further, the inclination of the auxiliary raceway surface is greater than that of a surface being just an extension of the raceway surface. That is, since an inclination angle of certain degrees can be secured, the auxiliary raceway surface will not be ground with the side surface of a grinding wheel during grinding work. This avoids an increase in the grinding work hours.

Patent Literature 2 discloses, in paragraphs 0005 to 0008, an auxiliary raceway surface that is provided at the edge of a raceway groove and smoothly continues from an arc-shaped curved line forming the raceway groove. The cross section of the auxiliary raceway surface is formed by a curved line with a curvature smaller than that of the arc-shaped curved line or by a straight line. While the effects exhibited by the auxiliary raceway surface are substantially similar to those of Patent Literature 1 as described above, in Patent Literature 2, a chamfered portion having an arc-shaped cross section being continuous to the edge of the auxiliary raceway surface is further formed. Thus, the edge load of the contact ellipse is further alleviated.

Conventionally, from the aspects of functions and works, a ratio $h/d$ of a groove depth h against a ball diameter d is $h/d<0.50$ in relation to the inner ring and $h/d<0.40$ in relation to the outer ring. With an h/d exceeding 0.50, in the cross section of the raceway groove, the sidewall of the raceway groove is inwardly warped, whereby grinding becomes difficult. Further, in relation to the outer ring, the upper limit of $h/d$ is 0.40.

The reason why the upper limit of the groove depth of the raceway groove is 0.40 d with the outer ring while the upper limit is 0.50 d with the inner ring is explained as follows. As to the inner ring, grinding work can be performed with an h/d exceeding 0.50, depending on the manner of abutting a grinding wheel. However, considering the number of work steps, it is practically difficult to achieve $h/d>0.50$. As to the outer ring, double rows of raceway grooves are simultaneously ground for higher precision. The only solution for achieving the simultaneous high precision grinding is plunge grinding using a form grinding wheel whose contour matches with the cross-sectional shape of the raceway grooves and whose feed is the cutting direction. Accordingly, it is difficult to form deep grooves, and an h/d of 0.40 is the limit.

Note that, H/d>0.50 in relation to the inner ring can be achieved by provision of the above-described auxiliary raceway surface. Here, reference character H represents the shoulder height including the auxiliary raceway surface, and reference character h represents the groove depth not including the auxiliary raceway surface. That is, conventionally, while there do not exist bearings attaining h/d>0.50, there exist bearings attaining H/d>0.50 (see Patent Literature 2).

CITATION LIST

Patent Literature

Patent Literature 1: Japanese Patent Laid-open Publication No. 2007-085555
Patent Literature 2: Japanese Patent Laid-open Publication No. 2011-241938

SUMMARY OF THE INVENTION

Technical Problems

During traveling of a vehicle, when a wheel bearing apparatus receives an excessive load from a wheel due to the vehicle making a turn or climbing up onto a curb, the contact ellipse between a ball and a raceway groove may override the shoulder, leaving indentations on the shoulder and emitting noises. In order to solve such an indentation problem, the shoulder height must be increased. On the other hand, an increase in the shoulder height invites an increase in the weight of the wheel bearing, a reduction in workability and the like, which disadvantageously results in an increase in costs. Further, an increase in the shoulder height of the inner ring reduces the cross-sectional height of a seal by the corresponding amount. Thus, sufficient sealability cannot be secured.

Further, the raceway groove has a cross-sectional shape in which the contour gradually rises from the bottom toward the shoulder of the raceway groove. Accordingly, with a conventional grinding manner, the pressing force of the grinding wheel in the cutting direction does not fully act around the shoulder and the force that presses the grinding wheel against the workpiece becomes small. This disadvantageously results in long work hours or grinding burns. Further, the bearing provided with the auxiliary raceway surface cannot undergo superfinishing process. There is also a problem of how to check the shape of such a bearing.

An object of the present invention is to provide a wheel bearing apparatus with which the problems described above are solved, and which is compact and capable of withstanding a high applied load without inviting an increase in the size of the bearing.

Solutions to Problems

According to the present invention, the object stated above is achieved by: employing hardened steel cutting as the method of forming the raceway grooves which is cutting performed after a heat treatment; providing the raceway grooves each having an arc-shaped raceway surface without an auxiliary raceway surface; and setting a great groove depth of h/D≥0.50.

That is, the present invention provides a wheel bearing apparatus for rotatably supporting a wheel, including: an inner member having two rows of raceway grooves on an outer circumference thereof; an outer member having two rows of raceway grooves on an inner circumference thereof, and a plurality of rolling elements interposed between the raceway grooves of the inner member and the raceway grooves of the outer member. The raceway grooves of the inner member and the raceway grooves of the outer member are formed by hardened steel cutting. In relation to at least a raceway groove on an outboard side out of the raceway grooves of the inner member, h/d exceeds 0.50 where h is a depth of the groove and d is a diameter of the rolling elements.

Advantageous Effects of Invention

According to the present invention, employing hardened steel cutting solves problems associated with grinding due to small pressing force in the cutting direction of a grinding wheel, that is, increased work hours and grinding burns, and enables work that provides a value higher than h/d≥0.50. Accordingly, a high applied load which has been conventionally addressed by an increase in the size of the bearing is addressed by an increase in the shoulder height. Thus, a bearing without an increase in the size (of compact design) can be provided.

DESCRIPTION OF EMBODIMENTS

In the following, a description will be given of an embodiment of the present invention with reference to the attached drawings.

Figure 1:
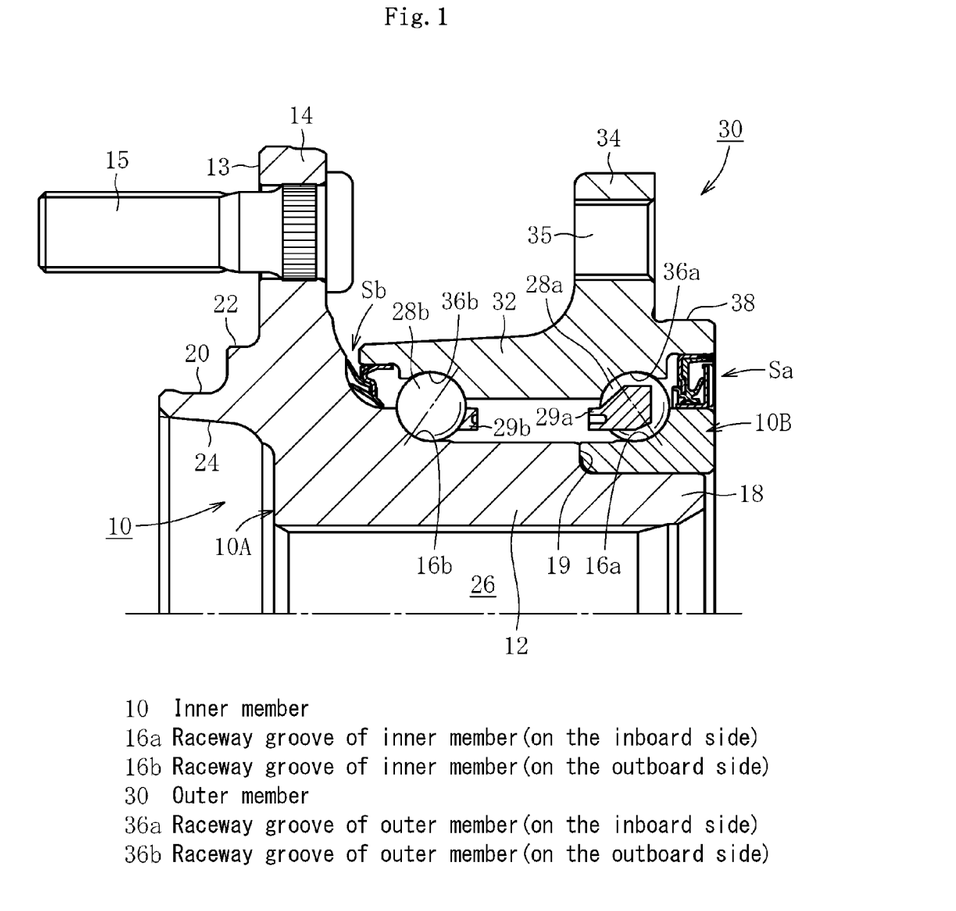
FIG. 1 is a half cross-sectional view of a wheel bearing apparatus for describing an embodiment.

A wheel bearing apparatus shown in FIG. 1 is for a driving wheel and is of the type called the third generation. The wheel bearing apparatus includes, as its main constituents, an inner member 10 corresponding to the bearing inner ring, an outer member 30 corresponding to the bearing outer ring, and two rows of rolling elements 28a, 28b. The inner member 10 and the outer member 30 are relatively rotatable via the rolling elements 28a, 28b. Note that, since the present embodiment is a double row angular contact ball bearing, balls 28a, 28b are used as the rolling elements. As is well known, the rows of balls 28a, 28b are retained at a predetermined interval in the circumferential direction by retainers 29a, 29b.

Here, in the state where the bearing is mounted on a vehicle, the side closer to the center of the vehicle is referred to as an inboard side, and the side closer to the outside of the vehicle is referred to as an outboard side. Of the two rows of balls, the balls on the inboard side are denoted by reference character 28a with a suffix "a", and the balls on the outboard side are denoted by reference character 28b with a suffix "b". Such a denoting rule of reference characters holds true for raceway grooves 16a, 16b, 36a, 36b, the retainers 29a, 29b, and seals Sa, Sb.

The inner member 10 is structured with a wheel hub 10A and an inner ring 10B. Two rows of raceway grooves 16a, 16b corresponding to inner ring raceways are respectively allocated to the inner ring 10B and the wheel hub 10A.

Figure 2:
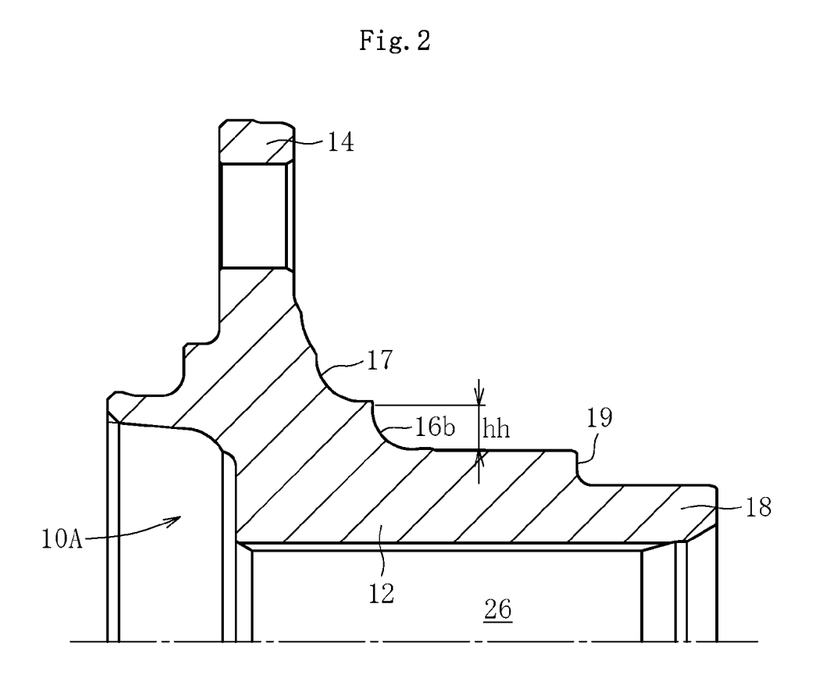
FIG. 2 is an enlarged view of a wheel hub in FIG. 1.

The wheel hub 10A is formed by medium carbon steel containing carbon by 0.40 to 0.80 wt % such as S53C. As shown in FIG. 2, the wheel hub 10A has a cylindrical portion 12 and a hub flange 14 which is positioned closer to the end portion on the outboard side (the left side in FIGS. 1 and 2) of the cylindrical portion 12. In FIG. 2, reference character hh represents the groove depth of the inboard side raceway groove 16b of the wheel hub 10A.

The hub flange 14 is for attaching the wheel hub 10A to the wheel and a brake rotor. Hub bolts 15 are implanted into the hub flange 14 at a predetermined interval in the circumferential direction. Note that, FIG. 2 shows the wheel hub 10A before the hub bolts 15 are implanted into the hub flange 14. Screwing not-shown hub nuts with the hub bolts 15 fastens the wheel and the brake rotor and the hub flange 14 with each other.

The wheel hub 10A is provided with a short cylindrical pilot portion at an end on the outboard side relative to the hub flange 14. The pilot portion is cylindrical with different diameters, in which the small diameter portion is a wheel pilot 20 and the great diameter portion is a disc pilot 22. In attaching the wheel and the brake rotor, the wheel pilot 20 and the disc pilot 22 serve to guide and center them, respectively. The inner diameter side of the pilot portion is hollowed to form a cylindrical inner circumferential surface 24.

The cylindrical portion 12 of the wheel hub 10A has a serration (or spline, the same holds true for the following description) hole 26 that penetrates in the axial direction. Since the wheel bearing apparatus according to the embodiment is for a driving wheel, a serration shaft of an outer joint member of a not-shown constant velocity universal joint is inserted into the serration hole 26 of the wheel hub 10A so that the constant velocity universal joint and the wheel hub 10A are coupled to each other to be able to transmit torque. Since the structure of the constant velocity universal joint is well known and does not directly relate to the present invention, the detailed description thereof is not provided.

In the flange surface of the hub flange 14, the flange surface 13 rising from the disc pilot 22 on the outboard side in the radial direction serves as a disc attaching surface for attaching the brake rotor. At the root portion of the flange surface on the inboard side, a seal land 17 for allowing a seal lip of the seal Sb to be in contact with is provided. The small diameter side of the seal land 17 extends in the axial direction and connected to the raceway groove 16b. At the end of the cylindrical portion 12 on the inboard side (the right side in FIGS. 1 and 2), a cylindrical small diameter shaft portion 18 is formed.

The small diameter shaft portion 18 of the wheel hub 10A supports the inner ring 10B. That is, the inner ring 10B is interference-fitted to the small diameter shaft portion 18, having its end surface abutted on a shoulder surface 19 that rises from the small diameter shaft portion 18 in the radial direction. Therefore, the shoulder surface 19 is referred to as an inner ring abutting surface or simply as the abutting surface.

Figure 3A:
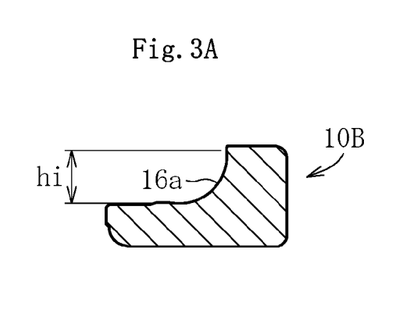
FIG. 3A is an enlarged view of an inner ring in FIG. 1.
Figure 3B:
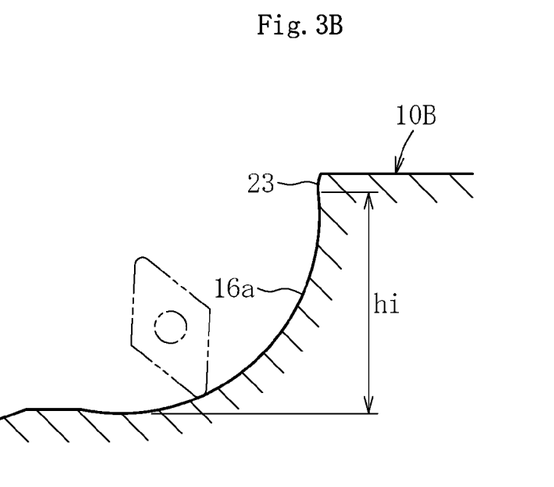
FIG. 3B is an enlarged view of a raceway groove portion in FIG. 3A.

The inner ring 10B is provided with the inboard-side raceway groove 16a on an outer circumference thereof. In FIGS. 3A and 3B, reference character hi represents the groove depth of the raceway groove 16a. As can be seen from FIG. 3B, a bevel 23 is formed at the edge of the raceway groove 16a by coining or the like, which bevel is not included in the groove depth hi. The same holds true for the inboard-side raceway groove 16b of the wheel hub 10A shown in FIG. 2.

FIG. 1 just simply shows the fixing scheme of the inner ring 10B. For example, in the state where the inner ring 10B abuts on the abutting surface 19, crimping the end of the small diameter shaft portion 18 of the wheel hub 10A can fix the inner ring 10B onto the small diameter shaft portion 18. Here, for example, by the inner ring 10B being axially applied with pressure toward the abutting surface 19, the distance between the raceway grooves 16a, 16b is reduced. Thus, consequently, a bearing preload is applied. For example, the preload can be managed by measuring torque during relative rotation of the inner member 10 and the outer member 30 and stop crimping when a torque value in a predetermined range is reached.

Figure 4A:
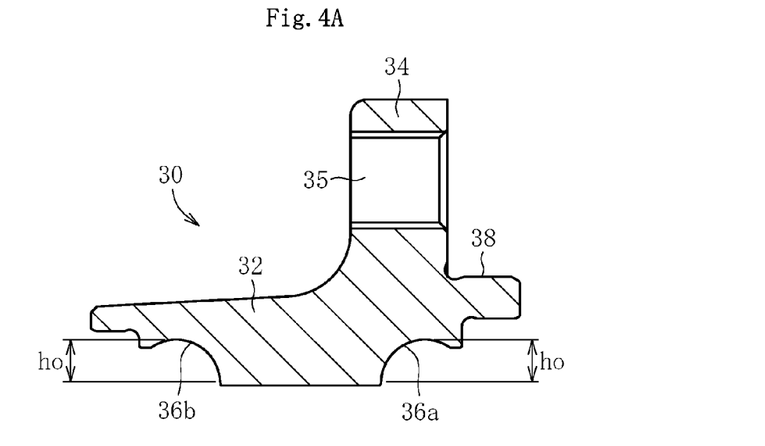
FIG. 4A is an enlarged view of an outer member in FIG. 1.

The outer member 30 is made up of a sleeve 32 and a flange 34. The sleeve 32 is provided with two rows of outer ring raceways, that is, the raceway grooves 36a, 36b, on an inner circumference thereof. As has already been described above, the raceway groove 36a is an inboard-side raceway groove and the raceway groove 36b is an outboard-side raceway groove. Since they are both outer ring raceways, as shown in FIG. 4A, the groove depth of each of the raceway grooves 36a, 36b is represented by reference character ho with a suffix "o". As can be seen from FIG. 4B, a bevel 37 is formed at the edge of each of raceway grooves 36a, 36b, which bevel 37 is not included in the groove depth ho.

Figure 5:
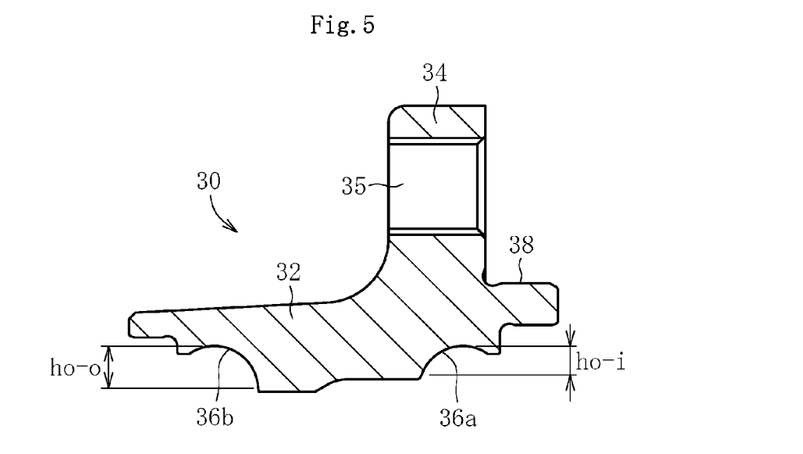
FIG. 5 is an enlarged view of an outer member similar to that shown in FIG. 4A.

Further, while FIG. 4A shows an example where the inboard-side raceway groove 36a and the outboard-side raceway groove 36b have the identical groove depth ho, FIG. 5 shows an example where they are different in the groove depth. That is, the groove depth of the inboard-side raceway groove 36a is represented by reference character ho-i, and the groove depth of the outboard-side raceway groove 36b by reference character ho-o. The outboard-side groove depth is greater than the inboard-side groove depth (ho-i<ho-o).

These raceway grooves 36a, 36b oppose to the raceway grooves 16a, 16b of the inner member 10 to form two rows of raceways for allowing the balls 28a, 28b to roll between the raceway grooves 36a, 36b and the raceway grooves 16a, 16b. In this manner, the inner member 10 and the outer member 30 are relatively rotatable via the balls 28a, 28b.

The flange 34 of the outer member 30 is for fixing the outer member 30 to the knuckle of the vehicle body (the chassis), and is provided with a plurality of screw holes 35 for the fixing. A pilot outer diameter 38 is formed at the end of the outer member 30 on the inboard side for being inserted into the housing hole of the knuckle to center the outer member 30.

The seals Sa, Sb are attached to the opposite openings of the outer member 30, so as to prevent leakage of lubricant such as grease with which the outer member 30 is filled inside, and entry of foreign matter from the outside. The seals Sa, Sb are attached to the opposite ends of the outer member 30. Specifically, the inboard-side seal Sa is of the type referred to as a pack seal which is made up of an inner element and an outer element. The outer element is press fitted into a hole formed at the inboard-side end of the outer member 30, and the inner element is fitted to the outer diameter surface of the inner ring 10B. The outboard-side seal Sb has its mandrel portion press fitted into a hole formed at the outboard-side end of the outer member 30, and has its seal lip brought into contact with the seal land 17 of the wheel hub 10A.

The inboard-side row of balls 28*a* and the outboard-side row of balls 28*b* are respectively in contact with the raceway grooves 16*a*, 16*b* of the inner member 10 and the raceway grooves 36*a*, 36*b* of the outer member 30 each at a contact angle. The contact angle is defined as an angle formed between a plane perpendicular to the bearing center axis (a radial plane) and a line of action of combined force transmitted from the raceway grooves 16*a*, 16*b*, 36*a*, 36*b* to the balls 28*a*, 28*b* (which is represented by alternate long and short dashed lines passing through the centers of the balls in FIG. 1). The embodiment corresponds to a back-to-back duplex arrangement, that is, two pieces of bearings being arranged so that the back sides of their respective outer rings are closely juxtaposed to each other. Since the present wheel bearing apparatus is capable of bearing the radial load and the axial loads in the opposite directions, it is suitable for the application in which a moment load acts, which may be observed when a vehicle makes a turn.

In mounting the wheel bearing apparatus structured as described above on an actual vehicle, the pilot outer diameter 38 of the outer member 30 is inserted into the housing hole of the knuckle, and the flange 34 is fixed to the knuckle by fastening bolts. Further, using the pilot portions (20, 22) of the inner member 10, the brake rotor (not shown) and the wheel (not shown) are attached to the hub bolts 15 of the hub flange 14, which hub bolts 15 are fastened by screwing hub nuts (not shown). At this time, the wheel is centered by the wheel pilot and the brake rotor is centered by the disc pilot.

Meanwhile, since the raceway grooves 16*a*, 16*b* of the inner member 10 and the raceway grooves 36*a*, 36*b* of the outer member 30 are the surfaces on which the balls 28*a*, 28*b* roll under a load, a hardened layer is formed on each of the grooves by a surface hardening heat treatment. The hardness of the hardened layer is about HRC 50 to 65.

An exemplary surface hardening heat treatment may be high frequency induction hardening or carburizing and quenching. High frequency induction hardening is a quenching method including: placing a portion necessary to be quenched inside a coil through which a high frequency current passes; and applying the principle of heating the electrically conductive material by Joule heat generated by the electromagnetic induction effect. Carburizing and quenching is a method including: heating steel for long hours in a gas, liquid, or solid carburizing agent that contains a great amount of activated carbon, thereby impregnating the surface layer of the steel with the carbon (a carburizing treatment); and subjecting the carburized steel to quenching and tempering.

The raceway grooves 16*a*, 16*b*, 36*a*, 36*b* are finished by hardened steel cutting. Hardened steel cutting is cutting performed after quenching, and distinguished, by its being performed after a heat treatment (quenching), from normal cutting which is performed on a non-quenched workpiece. Performing cutting after quenching, heat treatment distortion of the material can be canceled out during the process. Further, quenching tends to leave tensile residual stress, which invites a reduction in fatigue strength when unaddressed. Here, cutting the surface can provide compressive residual stress to the surface layer portion, improving the fatigue strength.

Figure 4B:
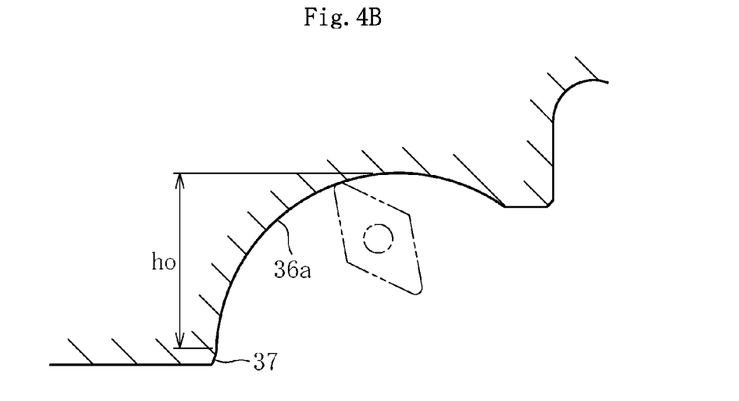
FIG. 4B is an enlarged view of a raceway groove portion on an inboard side in FIG. 4A.

As a cutting tool, a single-point cutting tool with which such cutting can be performed is used. An exemplary single-point cutting tool that can be used for hardened steel cutting may be a sintered compact tool in which a special ceramic binder is added to CBN (cubic boron nitride). In FIGS. 3B and 4B, a chain double-dashed line represents an exemplary rhombus chip of a single-point cutting tool.

The wheel hub 10A is finished to have the raceway groove 16*b* having a cross-sectional shape of a predetermined curvature, by being held by the cutting apparatus and rotated about its axis, and by adjustment of the cutting and axial feed of the single-point cutting tool. This substantially holds true for the inner ring 10B at least as to hardened steel cutting of the raceway groove 16*a*. Note that, the inner ring 10B is subjected to a heat treatment as an independent inner ring before being fitted to the wheel hub 10A, and thereafter subjected to hardened steel cutting.

The outer member 30 is finished to have the raceway grooves 36*a*, 36*b* each having a cross-sectional shape of a predetermined curvature, by being held by the cutting apparatus and rotated about its axis, and by adjustment of the cutting and axial feed of the single-point cutting tool. In this case, the outer member 30 is bored in contrast to the wheel hub 10A and inner ring 10B being cut around the outer diameter by hardened steel cutting. Further, the two rows of raceway grooves 36*a*, 36*b* are subjected to hardened steel cutting with separate single-point cutting tools.

In this manner, finishing the raceway grooves 16*a*, 16*b* of the inner member 10 and the raceway grooves 36*a*, 36*b* of the outer member 30 by hardened steel cutting eliminates the necessity of performing grinding for finishing the raceway grooves 16*a*, 16*b*, 36*a*, 36*b*.

In the case where the raceway grooves 36*a*, 36*b* of the outer member 30 are finished by grinding, a form grinding wheel having a portion corresponding to the two rows of raceway grooves 36*a*, 36*b* is used to cut the workpiece (outer member 30) at the right angle. Accordingly, it is geometrically impossible to form a raceway groove having a groove depth h which is 50% greater than a ball diameter d. Under present circumstances, 40% is the upper limit. Employing hardened steel cutting solves this challenge.

The effect of the embodiment described above is summarized and listed below.

The wheel bearing apparatus according to the embodiment is for rotatably supporting a wheel, and includes: the inner member 10 having two rows of raceway grooves 16*a*, 16*b* along its outer circumference; the outer member 30 having two rows of raceway grooves 36*a*, 36*b* along its inner circumference; and a plurality of rolling elements 28*a*, 28*b* interposed between the raceway grooves 16*a*, 16*b* of the inner member 10 and the raceway grooves 36*a*, 36*b* of the outer member 30. The raceway grooves 16*a*, 16*b* of the inner member 10 and the raceway grooves 36*a*, 36*b* of the outer member 30 are formed by hardened steel cutting. In relation to at least the raceway groove 16*b* on the outboard side out of the raceway grooves 16*a*, 16*b* of the inner member 10, h/d is set to exceed 0.50 where h is the depth of the raceway groove 16*b* and $d$ is the diameter of the ball 28*b*.

In relation to the raceway grooves 36*a*, 36*b* of the outer member 30, h/d is set to exceed 0.40 where h is the depth of the raceway grooves 36*a*, 36*b* and $d$ is the diameter of the rolling elements 28*a*, 28*b*.

Preferably, hi/d is 0.63 or smaller where hi is the depth of the raceway grooves 16*a*, 16*b* of the inner member 10 and d is the diameter of the balls 28*a*, 28*b*. Using hardened steel cutting, 0.63 d is still the limit of the groove depth h of the raceway grooves 16*a*, 16*b* of the inner member 10 from the limitations in the technical aspect.

Preferably, hh/d is 0.63 or smaller where hh is the depth of the raceway groove 16*b* of the wheel hub 10A.

Preferably, the upper limit of the groove depth h of the raceway grooves 36*a*, 36*b* of the outer member 30 is set to be 0.56 d. Using hardened steel cutting, 0.56 d is still the limit of the groove depth h of the raceway grooves of the outer member from the limitations in the technical aspect.

Preferably, the groove depth of the outboard-side raceway groove 36b of the outer member 30 is greater than the groove depth of the inboard-side raceway groove 36a. Since a greater moment load acts on the outboard-side row of balls 28b than the inboard-side row of balls 28a, the outboard-side row of balls 28b tends to suffer from shoulder overriding. Accordingly, desirably a greatest possible groove depth is set. Here, setting the groove depth of the outboard-side raceway groove to be greater than the groove depth of the inboard-side raceway groove improves resistance to indentation and prevents shoulder overriding of the contact ellipse, withstanding a great moment load put on the outboard-side ball row. This prevents generation of edge loads, and improves the noise level and the life of the bearing. Further, setting a minimum possible groove depth of the tolerating inboard-side raceway groove 36a thereby reducing the work hours, a reduction in the whole work hours can be achieved.

In the foregoing, the embodiment of the present invention has been described with reference to the attached drawings. It goes without saying that the present invention is not limited to the described and illustrated embodiment, and can be carried out with various modifications without departing from the scope of claims.

REFERENCE SIGNS LIST

10: Inner member
10A: Wheel hub
10B: Inner ring
12: Cylindrical portion
14: Hub flange
16a: Raceway groove (inboard side)
16b: Raceway groove (outboard side)
17: Seal land
18: Small diameter shaft portion
20: Wheel pilot
22: Disc pilot
23: Bevel
26: Serration hole
28a: Ball (inboard side)
28b: Ball (outboard side)
29a: Retainer (inboard side)
29b: Retainer (outboard side)
30: Outer member
32: Sleeve
34: Flange
36a: Raceway groove (inboard side)
36b: Raceway groove (outboard side)
37: Bevel
38: Pilot outer diameter
Sa: Seal (inboard side)
Sb: Seal (outboard side)

The invention claimed is:

1. A wheel bearing apparatus for rotatably supporting a wheel, comprising:
an inner member having two rows of raceway grooves on an outer circumference thereof;
an outer member having two rows of raceway grooves on an inner circumference thereof; and
a plurality of rolling elements interposed between the raceway grooves of the inner member and the raceway grooves of the outer member, wherein
the raceway grooves of the inner member and the raceway grooves of the outer member are formed by hardened steel cutting after a heat treatment, and
in relation to at least a raceway groove on an outboard side out of the raceway grooves of the inner member, h/d exceeds 0.50 where h is a depth of the groove and d is a diameter of the rolling elements.

2. The wheel bearing apparatus according to claim 1, wherein, in relation to the raceway grooves of the outer member, h/d is 0.56 or smaller.

3. The wheel bearing apparatus according to claim 1, wherein, among the raceway grooves of the outer member, a raceway groove on an outboard side is greater in depth than a raceway groove on an inboard side.

4. The wheel bearing apparatus according to claim 1, wherein
the inner member includes a hub wheel,
the hub wheel has one of the two raceway grooves of the inner member, and
hh/d is 0.63 or smaller where hh is a depth of the one of the two raceway grooves of the inner member.

5. The wheel bearing apparatus according to claim 4, wherein, in relation to the raceway grooves of the outer member, h/d is 0.56 or smaller.

6. The wheel bearing apparatus according to claim 1, wherein hi/d is 0.63 or smaller where hi is a depth of the raceway grooves of the inner member and d is the diameter of the balls.

7. The wheel bearing apparatus according to claim 6, wherein, in relation to the raceway grooves of the outer member, h/d is 0.56 or smaller.

8. The wheel bearing apparatus according to claim 6, wherein
the inner member includes a hub wheel,
the hub wheel has one of the two raceway grooves of the inner member, and
hh/d is 0.63 or smaller where hh is a depth of the one of the two raceway grooves of the inner member.

9. The wheel bearing apparatus according to claim 8, wherein, in relation to the raceway grooves of the outer member, h/d is 0.56 or smaller.

10. The wheel bearing apparatus according to claim 1, wherein, in relation to the raceway grooves of the outer member, h/d exceeds 0.40.

11. The wheel bearing apparatus according to claim 10, wherein, in relation to the raceway grooves of the outer member, h/d is 0.56 or smaller.

12. The wheel bearing apparatus according to claim 10, wherein
the inner member includes a hub wheel,
the hub wheel has one of the two raceway grooves of the inner member, and
hh/d is 0.63 or smaller where hh is a depth of the one of the two raceway grooves of the inner member.

13. The wheel bearing apparatus according to claim 12, wherein, in relation to the raceway grooves of the outer member, h/d is 0.56 or smaller.

14. The wheel bearing apparatus according to claim 10, wherein hi/d is 0.63 or smaller where hi is a depth of the raceway grooves of the inner member and d is the diameter of the balls.

15. The wheel bearing apparatus according to claim 14, wherein, in relation to the raceway grooves of the outer member, h/d is 0.56 or smaller.

16. The wheel bearing apparatus according to claim 14, wherein
the inner member includes a hub wheel, the hub wheel has one of the two raceway grooves of the inner member, and hh/d is 0.63 or smaller where hh is a depth of the one of the raceway grooves of the inner member.

17. The wheel bearing apparatus according to claim 16, wherein, in relation to the raceway grooves of the outer member, h/d is 0.56 or smaller.

\* \* \* \* \*